US009911196B2

(12) United States Patent
Saboune et al.

(10) Patent No.: US 9,911,196 B2
(45) Date of Patent: Mar. 6, 2018

(54) METHOD AND APPARATUS TO GENERATE HAPTIC FEEDBACK FROM VIDEO CONTENT ANALYSIS

(71) Applicant: IMMERSION CORPORATION, San Jose, CA (US)

(72) Inventors: Jamal Saboune, Montreal (CA); Juan Manuel Cruz-Hernandez, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 314 days.

(21) Appl. No.: 14/719,491

(22) Filed: May 22, 2015

(65) Prior Publication Data

US 2015/0262376 A1    Sep. 17, 2015

Related U.S. Application Data

(63) Continuation of application No. 13/843,092, filed on Mar. 15, 2013, now Pat. No. 9,064,385.

(51) Int. Cl.
| | |
|---|---|
| *G08B 6/00* | (2006.01) |
| *H04N 5/14* | (2006.01) |
| *H04N 21/43* | (2011.01) |
| *H04N 9/79* | (2006.01) |
| *H04N 21/845* | (2011.01) |
| *G06T 7/20* | (2017.01) |
| *H04N 21/435* | (2011.01) |

(52) U.S. Cl.
CPC ............ *G06T 7/20* (2013.01); *G08B 6/00* (2013.01); *H04N 5/145* (2013.01); *H04N 9/79* (2013.01); *H04N 21/435* (2013.01); *H04N 21/4307* (2013.01); *H04N 21/845* (2013.01)

(58) Field of Classification Search
CPC ...... G08B 6/00; H04N 5/145; H04N 21/4307; H04N 9/79; H04N 21/845; H04N 21/435; G06T 7/20
See application file for complete search history.

(56) References Cited

U.S. PATENT DOCUMENTS

| | | | |
|---|---|---|---|
| 2009/0189748 | A1 | 7/2009 | Bergere |
| 2009/0244323 | A1 | 10/2009 | Carter et al. |

(Continued)

FOREIGN PATENT DOCUMENTS

| | | |
|---|---|---|
| CN | 101507290 A | 8/2009 |
| CN | 100546358 C | 9/2009 |

(Continued)

OTHER PUBLICATIONS

Danieau, F., et al., "A Framework for Enhancing Video Viewing Experience with Haptic Effects of Motion," IEEE Haptics Symposium 2012, Mar. 4-7, 2012, pp. 541-546.

*Primary Examiner* — Charles Hicks
(74) *Attorney, Agent, or Firm* — Miles & Stockbridge P.C.

(57) ABSTRACT

A system includes an image capture device configured to capture images, and a processor programmed with one or more computer program modules. When executed, the one or more computer program modules are configured to receive the images captured by the image capture device, generate a control signal for a haptic output device as the images are received, synchronize the images and the control signal, and output a video with the synchronized images and the control signal.

15 Claims, 6 Drawing Sheets

(56) References Cited

U.S. PATENT DOCUMENTS

| | | | |
|---|---|---|---|
| 2011/0069229 A1* | 3/2011 | Lord | H04N 5/77 348/461 |
| 2011/0133910 A1 | 6/2011 | Alarcon | |
| 2013/0038792 A1* | 2/2013 | Quigley | A61H 19/00 348/515 |

FOREIGN PATENT DOCUMENTS

| | | |
|---|---|---|
| CN | 102227694 A | 10/2011 |
| CN | 102473172 A | 5/2012 |
| JP | 2003099177 A | 4/2003 |
| JP | 2011501575 A | 1/2011 |
| JP | 2013500544 A | 1/2013 |
| WO | 2011011737 A1 | 1/2011 |
| WO | WO 2011/007289 | 1/2011 |

* cited by examiner

METHOD AND APPARATUS TO GENERATE HAPTIC FEEDBACK FROM VIDEO CONTENT ANALYSIS

CROSS-REFERENCE TO RELATED APPLICATIONS

This application is a continuation application claiming the benefit of priority from U.S. patent application Ser. No. 13/843,092, filed Mar. 15, 2013, the entire content of which is incorporate herein by reference.

FIELD

The disclosure relates to systems and methods of generating haptic feedback based on video content analysis, sensor information, from one or more sensors, that includes one or more measurements of motion of one or more objects appearing on a video, and/or sensor information that includes one or more measurements of motion of one or more image capture devices.

BACKGROUND

Conventional multimedia content such as video may be enhanced with haptic feedback. However, such enhancements typically require embedding information that encodes the haptic feedback directly into the video. Thus, these techniques are unable to provide real-time haptic feedback on pre-existing video that has not already been annotated with the information that encodes the haptic feedback.

Furthermore, conventional media playback systems do not leverage sensor information that indicates a motion of an object that appears in a scene in the video to generate haptic feedback. Additionally, estimating an acceleration of an object based on video information may be inaccurate when the object is travelling at high speeds due to blur and other artifacts, while estimating an acceleration of the object using information from a sensor attached to the object may be inaccurate at low speeds.

SUMMARY

The disclosure relates to systems and methods of generating haptic feedback based on video content analysis, sensor information, from one or more sensors, that includes one or more measurements of motion of one or more objects such as a person appearing on a video, and/or sensor information that includes one or more measurements of motion of one or more image capture devices. Generally speaking, the system may include a computing device having one or more processors programmed to perform the video content analysis and/or use the sensor information to cause a haptic feedback to be generated, thereby enhancing the user experience.

The haptic feedback may vary based on an estimated acceleration of an object of a scene of the video, wherein the estimated acceleration is based on the image processing. The estimated acceleration may be made more accurate at high speeds using the sensor information and an estimated acceleration based on the sensor information may be made more accurate at lower speeds based on the image processing.

In some implementations, the video content analysis may include image processing of one or more frames of the video. The computing device may identify one or more events based on the image processing and cause a haptic feedback based on the one or more events. The events may include, for example, movement of an image capture device, an appearance of an object, an appearance of a body part, an explosion, a moving object, a particular recognizable image feature, a facial expression, a gesture, a scene theme, and/or other events that may be identified based on the image processing.

The computing device may generate a control signal that causes the haptic feedback and communicate the control signal to one or more haptic output devices that output the haptic feedback. The haptic output devices may be configured in various ways depending on particular uses and implementations of the computing device. For instance, haptic output devices may be integrated with the computing device (e.g., integrated within a common housing), a user interface device, a wearable device, a chair (e.g., in a movie theatre setting where the computing device performs image processing on a movie to provide immersive haptic feedback while watching the movie), and/or other configuration depending on particular implementations.

Because the haptic feedback may be generated based on image processing, the computing device facilitates real-time haptic feedback without upstream embedding or provisioning of information that encodes haptic feedback into multimedia files or multimedia streams. Thus, the computing device may enhance video (and/or other multimedia content for which image processing may be performed) with haptic feedback even though the video has not been provided in association with or otherwise have embedded within information that causes the haptic feedback.

In some implementations, the computing device may use sensor information that includes one or more measurements of motion related to multimedia content such as a video and generate the control signal that causes the haptic feedback. For example, at the time of capturing the video, one or more sensors may be coupled to an image capture device (e.g., a video camera) and/or an object being tracked (e.g., an object that appears on the video) such that the sensors measure a motion of the image capture device and/or the object and output sensor information that includes the measurements. In this manner, the motion of the object and/or the image capture device may be measured in order to provide sensor information used to provide haptic feedback. The captured video and/or sensor information may be streamed in real-time and/or stored for later provision to the computing device for playback.

The computing device may obtain the sensor information and generate the control signal responsive to the sensor information. For example, the sensor information may indicate that the image capture device is in motion during a particular scene of a video. The computing device may generate a control signal responsive to the motion of the image capture device while capturing the particular scene, as determined based on the sensor information. Likewise, the sensor information may indicate that an object that appears on a scene of the video is in motion. The computing device may generate a control signal responsive to the motion of the object, as determined based on the sensor information. In some implementations, the computing device may generate a control signal that causes a haptic feedback based on a combination of motion of the image capture device and the object being tracked.

In some implementations, the computing device may generate a first estimate of the speed, acceleration, and/or angular velocity of the object based on image processing and a second estimate of the speed, acceleration, and/or angular velocity of the object based on the sensor information. The computing device may generate a fused estimate of the speed, acceleration, and/or angular velocity of the object based on the first estimate and the second estimate. Using the fused estimate, the computing device may generate the control signal. In some implementations, the computing device may use the first estimate (based on the image processing) alone to generate the control signal.

Whichever ones of the foregoing implementations of using motion information related to the video to generate the control signal is used, the computing device may enhance the video experience by causing haptic feedback to be provided when on-scene objects and/or image capture devices that capture scenes are in motion. For example, when the computing device determines that an object accelerates during a scene, the computing device may provide a control signal that causes haptic feedback that increases in intensity.

In some implementations, the computing device may use image processing of the video alone to generate the control signal that causes the haptic feedback. In other implementations, the computing device may use sensor information alone to generate the control signal that causes the haptic feedback. In still other implementations, the computing device may use image processing in combination with the sensor information to generate the control signal that causes the haptic feedback.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

The disclosure relates to systems and methods of generating haptic feedback based on video content analysis and/or sensor information that includes one or more measurements of motion of one or more objects appearing on a video, and/or sensor information that includes one or more measurements of motion of one or more image capture devices.

Figure 1:
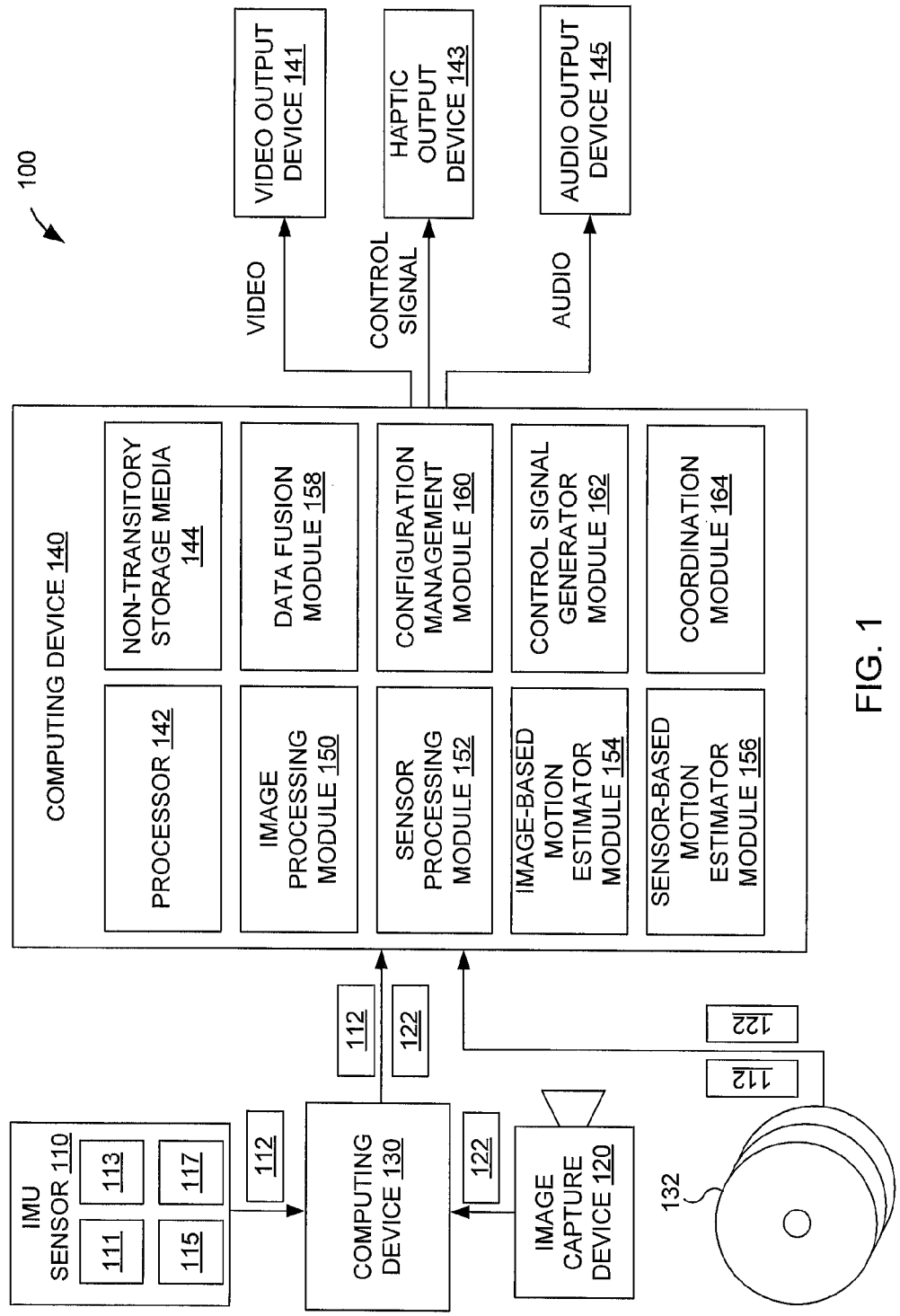
FIG. 1 illustrates a system configured to generate haptic feedback based on video content analysis, according to an aspect of the invention.

FIG. 1 illustrates a system 100 configured to generate haptic feedback based on video content analysis, according to an aspect of the invention. System 100 may include an Inertial Measurement Unit ("IMU") sensor 110, a image capture device 120, a computing device 130, a computing device 140, a video output device 141, a haptic output device 143, an audio output device 145, and/or other components. Although only single ones of the foregoing components are illustrated in FIG. 1, more than one of such components may be used. For example, one or more IMU sensors 110 may be used. IMU sensors 110 may individually operate at different frequencies and/or measurement ranges. In some implementations, different IMU sensors 110 may be attached to different objects and/or different image capture devices 120 related to a scene.

In some implementations, IMU sensor 110 may include a three-dimensional ("3D") gyroscope 111, a 3D accelerometer 113, a 3D magnetometer 115, and/or other sensor devices 117. Using 3D gyroscope 111, 3D accelerometer 113, 3D magnetometer 115, and/or other sensor devices 117, IMU sensor 110 may generate sensor information 112 that includes one or more measurements of a motion of IMU sensor 110. For example, when IMU sensor 110 is attached to an object, 3D gyroscope 111, 3D accelerometer 113, 3D magnetometer 115, and/or other sensor devices 117 may measure the motion of the object and generate the sensor information 112, which may be communicated to computing device 130. In some implementations, image capture device 120 may include a video camera and/or other image or image capture device. Image capture device 120 may capture one or more images and generate a video 122, which may be communicated to computing device 130. In some implementations, more than one image capture device 120 may film the same or different objects in a scene from different angles and/or other views. In some implementations, IMU sensor 110 may be attached to image capture device 120 such that the motion of the image capture device may be obtained and reported in sensor information 112. In some implementations, a first IMU sensor 110 may be attached to image capture device 120 and a second IMU sensor 110 may be attached to an object. Still another IMU sensor 110 may be attached to yet another object and/or another image capture device 120, and so on.

In some implementations, computing device 130 may store sensor information 112 and/or video 122 in a database for later provisioning to computing device 140. Computing device 130 may provide sensor information 112 and/or video 122 to computing device 140. When sensor information 112 and video 122 are provided, sensor information 112 may be embedded within video 122 using conventional video formats that can accommodate data. Alternatively, computing device 130 may separately provide sensor information 112 and video 122. In some implementations, sensor information 112 and/or video 122 may be provided to computing device 140 in the form of one or more readable media 132, which may be generated by computing device 130 and/or other device.

In some implementations, computing device 140 may include one or more processors 142 programmed with one or more computer program modules, which may be stored in one or non-transitory storage media 144. Computing device 140 may be programmed by the modules to perform image processing on video 122 and/or incorporate sensor information 112 to generate one or more control signals that cause haptic feedback based on the image processing on video 122 and/or use of sensor information 112.

The modules may include an image processing module 150, a sensor processing module 152, an image-based motion estimator module 154, a sensor-based motion estimator module 156, a data fusion module 158, a configuration management module 160, a control signal generator module 162, a coordination module 164, and/or other modules.

In some implementations, image processing module 150 may be configured to perform video content analysis on video 122. Whether video 122 is streamed from computing device 130, downloaded and stored locally for playback, read from media 132, and/or otherwise obtained in another manner, image processing module 150 may buffer video 122 in a memory to process one or more image frames of the video in order to detect one or more events of interest. Different types of events of interest may be detected in various ways.

In some implementations, image processing module 150 may detect a movement in relation to a stationary object in a given scene by determining the optical flow of the object in relation to one image frame to another image frame. Such processing may indicate that the image capture device used to create video 122 was in motion. Image processing module 150 may determine the speed of the motion based on the image processing, which may trigger creation of the control signal that causes the haptic feedback. Image processing module 150 may perform conventional optical flow calculations, as would be apparent by those having skill in the art.

In some implementations, image-based motion estimator module 154 may determine the speed, acceleration, and/or velocity of a motion of an object that appears on-scene based on the image processing using one or more videos 122. In implementations using more than one video 122, parallel video feeds may be used for stereovision, or otherwise to provide two or more different perspectives of a scene, which may improve accuracy of the motion estimate compared to using fewer video feeds or perspectives. Such speed, acceleration and/or velocity of the motion of the object may be included as a detected event that triggers creation of a control signal.

In some implementations, image processing module 150 may detect that a new body part has entered a given scene based on comparison to a database of body parts (e.g., faces, hands, etc.). Entry of the new body part may indicate that a new character has entered the scene, which may trigger creation of the control signal that causes the haptic feedback.

In some implementations, image processing module 150 may detect a change in the distribution or configuration of colors from one scene to the next (as reflected in the one or more image frames). For example, image processing module 150 may determine a Hue Saturation Value ("HSV") color histogram for different such as consecutive frames and determine whether the HSV color histogram has changed from one frame to another frame. If the HSV color histogram has changed, image processing module 150 may determine that a new object or otherwise change in the scene has occurred.

In some implementations, image processing module 150 may detect overall changes from light to dark and vice versa, potentially indicating an ambiance change of the scene, which may trigger creation of the control signal that causes the haptic feedback. In some implementations, the ambiance change of the scene may cause haptic feedback to be modulated based on the ambiance change.

In some implementations, image processing module 150 may detect a mood or emotion of actors in a given scene based on conventional image processing and mood detection techniques, which may trigger creation of the control signal that causes the haptic feedback.

In some implementations, image processing module 150 may detect a fire, explosion, and/or other occurrence in the video that may cause a particular pattern of color, which may trigger creation of the control signal that causes the haptic feedback. In some implementations, image processing module 150 may detect particular people or objects that appear on-screen. For example, a user may specify that a haptic feedback be provided when a particular object or person has entered a scene.

Image processing module 150 may perform all or a portion of the foregoing and/or other event detection when processing the image frames. Responsive to the detected events, control signal generator module 162 may generate one or more control signals for causing the haptic feedback. The control signals may cause different haptic effects, depending on the event that was detected (e.g., faster image capture device and/or object motion may result in a control signal that causes a greater magnitude or other characteristic of haptic feedback than slower image capture device and/or object motion). Furthermore, image processing module 150 may generate different control signals (causing different haptic feedback) for different types and/or combinations of types of detected events.

In some implementations, sensor processing module 152 may be configured to detect sensor-based events based on sensor information 112. For example, sensor-based events may include a particular motion of an object, a person, image capture device 120, and/or other motion in relation to video 122. In some implementations, sensor-based motion estimator module 156 may be configured to determine a speed, acceleration, velocity, and/or other characteristic of motion based on processing of sensor information 112. The sensor-based events may cause a control signal to be generated for providing a haptic feedback. The haptic feedback may vary based on the sensor-based event. As a particular example, when a motion of an object is detected, the control signal may be created to cause the haptic feedback. Such haptic feedback may vary based on the level of motion that was detected.

In some implementations, sensor processing module 152 may synchronize sensor information 112 with video 122 based on whether a single device was used to generate the sensor information and the video (e.g., when a mobile device or other device having both sensors and image capture devices is used to both capture video and collect sensor information). If a single device was used to capture both the video and the sensor information, then both will typically be synchronized by the single device. On the other hand, if the single device does not synchronize the sensor information and the video, then sensor processing module 152 may synchronize the two based on timestamps that use a common time reference (e.g., Global Positioning System time), and/or event detection described herein.

Figure 2A:
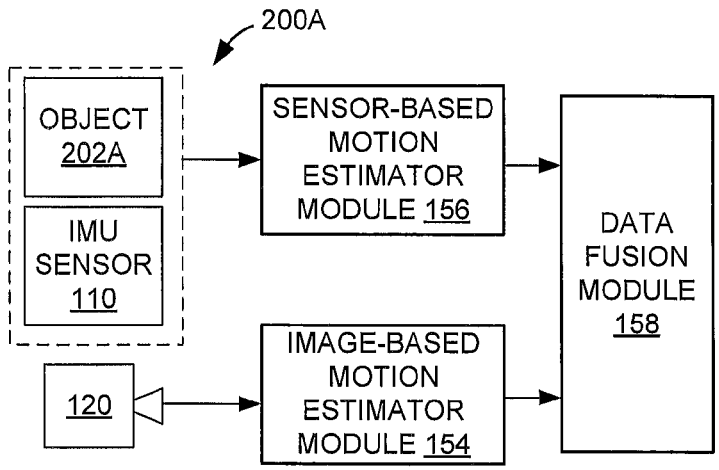
FIG. 2A illustrates an example of a scenario in which an IMU sensor is coupled to an object that is being filmed by a stationary image capture device and the motion of the object is being measured by the IMU sensor for generating haptic feedback, according to an aspect of the invention.
Figure 2B:
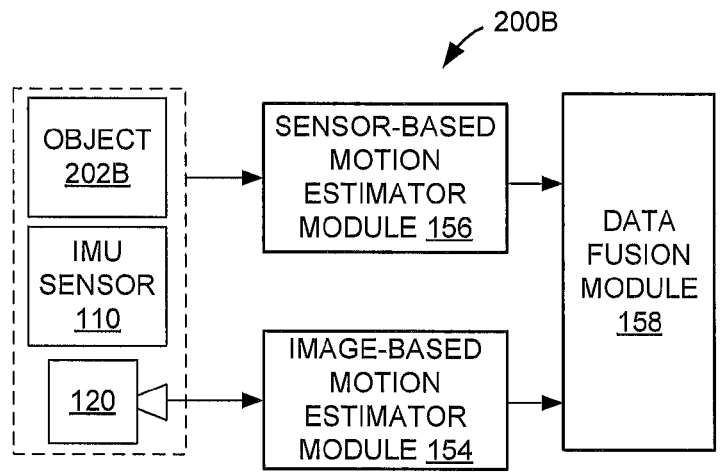
FIG. 2B illustrates an example of a scenario in which an IMU sensor is coupled to an object and an image capture device and the motion of the object is being measured by the IMU sensor for generating haptic feedback, according to an aspect of the invention.
Figure 2C:
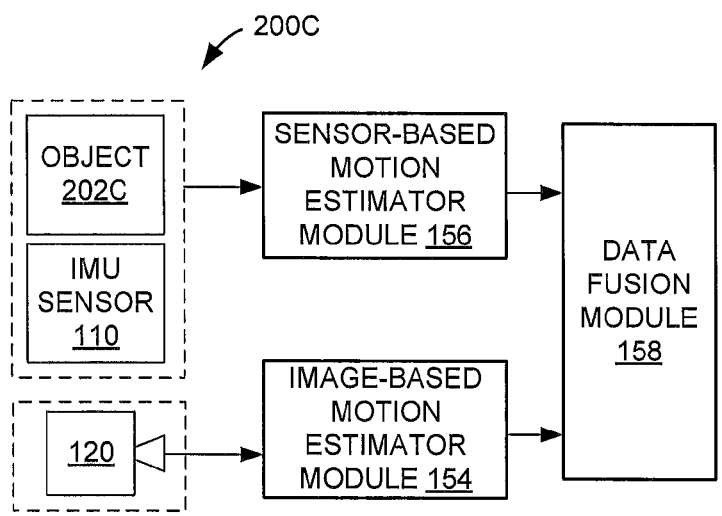
FIG. 2C illustrates an example of a scenario in which an IMU sensor is coupled to an object that is being filmed by a moving image capture device and the motion of the object is being measured by the IMU sensor for generating haptic feedback, according to an aspect of the invention.

In some implementations, data fusion module 158 may be configured to combine the information from image processing module 150, sensor processing module 152, image-based motion estimator module 154, and/or sensor-based motion estimator module 156 for improving acceleration estimates of objects to thereby enhance the quality of the haptic feedback provided responsive to the acceleration estimates, as described further with respect to FIGS. 2A-2C.

In some implementations, configuration management module 160 may be configured to obtain user preferences or other inputs that indicate different haptic feedback or levels of haptic feedback that should be provided in response to detection of particular events. For example, a user may identify or specify events (if any) that trigger haptic feedback and/or levels of haptic feedback. In this manner, a user may customize video viewing and haptic feedback generation.

In some implementations, control signal generator module 162 may be configured to generate one or more control signals that cause haptic feedback. Control signal generator module 162 may generate control signals responsive to the foregoing events detected by or outputs from image processing module 150, sensor processing module 152, image-based motion estimator module 154, sensor-based motion estimator module 156, data fusion module 158, and/or configuration management module 160. In some implementations, control signal generator 162 may generate control signals based on the particular configuration (e.g., number, type, placement, etc.) of one or more haptic output devices 143 that generate haptic feedback responsive to the control signals. In this manner, computing device 140 facilitates various types of haptic feedback responsive to different types of events, characteristics of events (e.g., estimated speed of an object appearing in a given scene), and/or user preferences/configurations.

In some implementations, coordination module 164 may be configured to coordinate video output, control signal output, and audio output respectively to video output device 141, haptic output device 143, and audio output device 145. Video output device 141 may include a display such as a touchscreen display, a monitor, and/or other display that can display the video output. In some implementations, coordination module 164 may synchronize the video output, control signal (e.g., haptic feedback caused by the control signal), and audio output according to a synchronizing code embedded into video 122 and/or via time stamps that generally set a time for outputting each of the video output, audio output, and haptic feedback.

Haptic output device 143 may include an actuator, for example, an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers, or shape memory alloys, a macro-composite fiber actuator, an electro-static actuator, an electro-tactile actuator, and/or another type of actuator that provides a physical feedback such as a haptic (e.g., vibrotactile) feedback. The haptic output device 143 may include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on.

Audio output device 145 may include speakers or other devices that can emit audio. In some implementations, video output device 141, haptic output device 143, and/or audio output device 145 may be integrated with computing device 140. In some implementations, video output device 141, haptic output device 143, and/or audio output device 145 may be housed separately from computing device 140.

In some implementations, computing device 130 may be programmed with the modules discussed in relation to computing device 140. Thus, at least some or all of the functions described above with respect to computing device 140 may be performed at computing device 130. For instance, computing device 130 may perform image processing on videos that it creates and/or otherwise provides such that the provided videos are enhanced with control signals that may be synchronized with the provided video. In this manner, a user device that consumes the video and control signals may cause the video to be displayed and cause synchronized haptic feedback to be generated.

Non-transitory storage media 144 may include one or both of system storage that is provided integrally (i.e., substantially non-removable) with computing device 140 and/or removable storage that is removably connectable to computing device 140 via, for example, a port (e.g., a USB port, a firewire port, etc.) or a drive (e.g., a disk drive, etc.). Non-transitory storage media 144 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Non-transitory storage media 144 may include one or more virtual storage resources (e.g., cloud storage, a virtual private network, and/or other virtual storage resources). Non-transitory storage media 144 may store software algorithms, information determined by processor(s) 142, information received from computing device 140, and/or other information that enables computing device 140 to function as described herein.

Processor(s) 142 are configured to provide information processing capabilities in computing device 140. As such, processor(s) 142 may include one or more of a digital processor, an analog processor, a digital circuit designed to process information, an analog circuit designed to process information, a state machine, and/or other mechanisms for electronically processing information. Although processor(s) 142 is illustrated in FIG. 1 as a single entity, this is for illustrative purposes only. In some implementations, processor(s) 142 may include a plurality of processing units. These processing units may be physically located within the same device, or processor(s) 142 may represent processing functionality of a plurality of devices operating in coordination. Processor(s) 142 may be configured to execute modules by software; hardware; firmware; some combination of software, hardware, and/or firmware; and/or other mechanisms for configuring processing capabilities on processor(s) 142.

The various modules described herein are exemplary only. Other configurations and numbers of modules may be used, as well using non-modular approaches so long as the one or more physical processors are programmed to perform the functions described herein. It should be appreciated that although modules 150, 152, 154, 156, 158, 160, 162, and 164 are illustrated in FIG. 1 as being co-located within a single processing unit, in implementations in which processor(s) 142 includes multiple processing units, one or more modules may be located remotely from the other modules. The description of the functionality provided by the different modules described herein is for illustrative purposes, and is not intended to be limiting, as any of modules may provide more or less functionality than is described. For example, one or more of the modules may be eliminated, and some or all of its functionality may be provided by other ones of the modules. As another example, processor(s) 142 may be configured to execute one or more additional modules that may perform some or all of the functionality attributed herein to one of modules.

The components illustrated in FIG. 1 may be communicably coupled to one another via various communication links such as a network. The network may include wired or wireless connections. In some aspects of the invention, the network may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network.

Various inputs, outputs, configurations, and/or other information described herein as being stored or storable may be stored in one or more databases (not illustrated in FIG. 1). Such databases may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

FIG. 2A illustrates an example of a scenario 200A in which an IMU sensor 110 is coupled to an object 202A that is being filmed by a stationary image capture device 120 and the motion of object 202A is being measured by IMU sensor 110 for improving the accelerations estimate of object 202A, according to an aspect of the invention.

The image capture device frames information and basic knowledge of object 202A, which may be of interest, may be used to estimate its 3D movement and its position in the fixed image capture device referential using conventional computer vision approaches. IMU sensor 110 attached to object 202A may provide inertial data estimation that will be made more accurate using the data provided by the image capture device 120.

The object 202A that is used as the basis for providing haptic feedback may be chosen by a user in advance. Image-based motion estimator module 154 may determine the acceleration of object 202A by detecting object 202A in two or more consecutive images (given its characteristics or some of its feature points) using a conventional template matching approach (e.g. optical flow, Histogram of Oriented Gradients ("HOG"), 3D model pose estimation, etc.). In some implementations, data fusion module 158 may determine the motion of object 202A by combining its motion estimated by image-based motion estimator module 154 with the motion estimated by the sensor-based motion estimator 156

FIG. 2B illustrates an example of a scenario 200B in which an IMU sensor 110 is coupled to an object 202B and an image capture device 120 and the motion of object 202B is being measured by IMU sensor 110 for improving the accelerations estimate of object 202B, according to an aspect of the invention.

Image-based motion estimator module 154 may apply computer vision algorithms to estimate the 3D camera pose (position and orientation in a fixed referential) from successive frames using some visual fix invariant features in the scene. Estimating the camera pose may be equivalent to estimating the object pose in this case. The estimated data may be combined to that provided by IMU sensor 110 attached to object 202B in order to make it more accurate using data fusion module 158.

If the haptic feedback is relative to the image capture device 120's movement, only the intrinsic parameters of the image capture device may be used. Image-based motion estimator module 154 may determine the optical flow for some invariant stationary features in the scene (e.g. Scale-Invariant Feature Transforms, Speeded Up Robust Features, etc.). The movement of the image capture device 120/object 202B would be the inverse of the calculated optical flow.

FIG. 2C illustrates an example of a scenario 200C in which an IMU sensor 110 is coupled to an object 202C that is being filmed by a moving image capture device 120 and the motion of the object is being measured by IMU sensor 110 for improving the accelerations estimate of object 202C, according to an aspect of the invention. In some implementations (not illustrated in FIG. 2C) IMU sensor 110 may be coupled to image capture device 120 to provide one or more measurements of its motion.

Image-based motion estimator module 154 may apply computer vision algorithms to estimate the 3D camera pose (position and orientation in a fixed referential) from successive frames using some visual fix invariant features in the scene. The image capture device frames information and basic knowledge of characteristics of object 202C can be used to estimate its 3D movement and its position in the image capture device referential using computer vision approaches. The object position and movement can then be translated to a global fixed referential and fused with the sensor information from IMU 110 using data fusion module 158.

The intrinsic parameters of the image capture device and the characteristics of the objects/person in the video feed, for which the haptic feedback would be created, may be used. Image-based motion estimator module 154 may determine the movement of the image capture device 120 by calculating the optical flow for some invariant stationary features in the scene. Using data fusion module 158 this movement can be estimated with higher precision if an IMU sensor 110 is coupled with image capture device 120. By template matching, Using data fusion module 158 this movement can be estimated with higher precision if an IMU sensor is coupled with the device 120 may estimate the relative movement of object 202C in the scene. By correlating both values, the movement in a fix referential is then evaluated.

Figure 3:
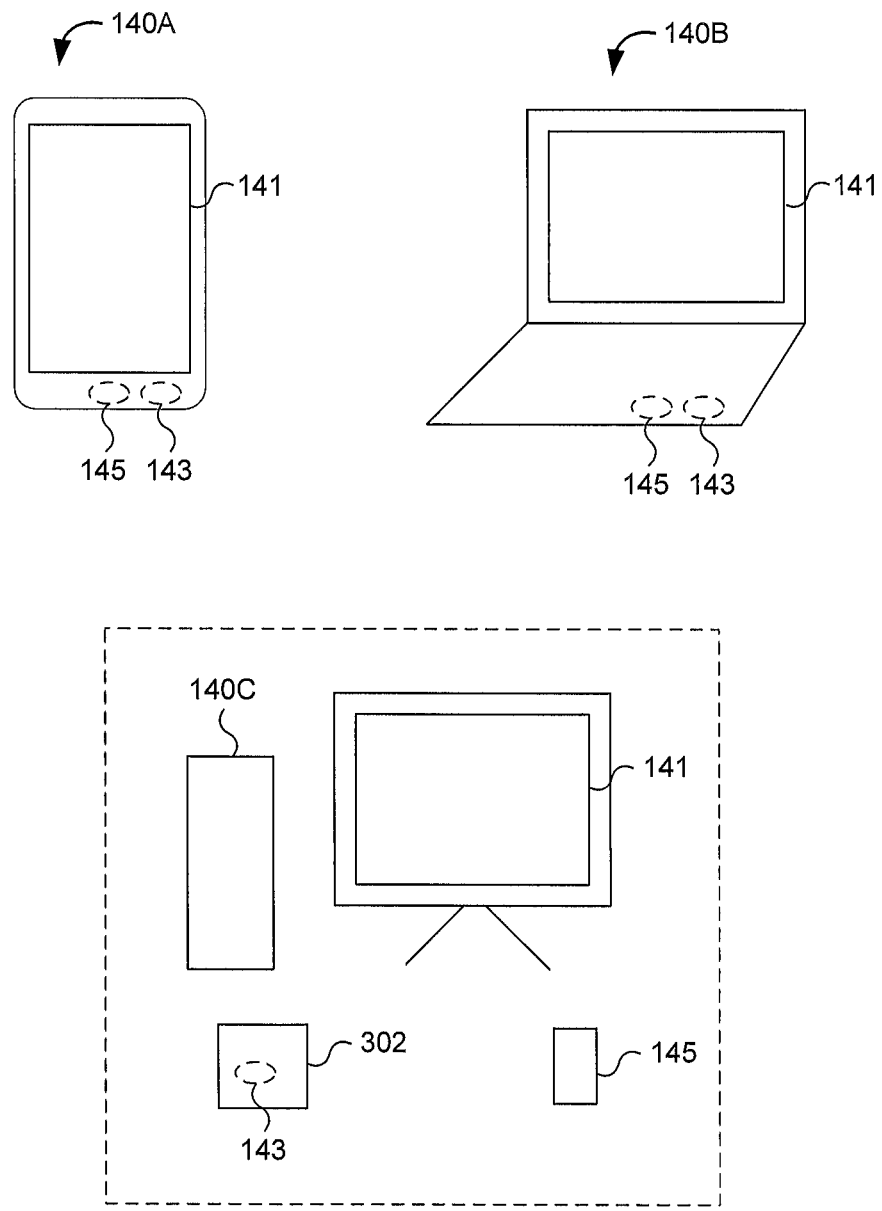
FIG. 3 illustrates examples of implementations of a computing device that is configured to generate haptic feedback based on video content analysis, according to an aspect of the invention.

FIG. 3 illustrates examples of implementations of the computing device 140 that is configured to generate haptic feedback based on video content analysis, according to an aspect of the invention. Computing device 140A may be configured as a mobile device such as a smartphone having an integrated video output device 141 (e.g., a touchscreen display), an integrated haptic output device 143, and an integrated audio output device 145. In this implementation, computing device 140A may be used to view video content while receiving haptic feedback through the mobile device. In some implementations, an external haptic device can also be coupled to computing device 140A via a wired or wireless connection.

Computing device 140B may be configured as a portable computing device such as a laptop computer having an integrated haptic output device 143, and an integrated audio output device 145. In this implementation, computing device 140B may be used to view video content while receiving haptic feedback through the portable computing device. In some implementations, an external haptic device can also be coupled to computing device 140B via a wired or wireless connection.

Computing device 140C may be configured as a stand-alone computing device such as a desktop computer, a gaming console, or other standalone computing device. In this implementation, computing device 140C may be coupled to a separate video output device 141, a separate audio output device 145, and a separate user touch point 302, which may house the haptic output device 143.

Figure 4:
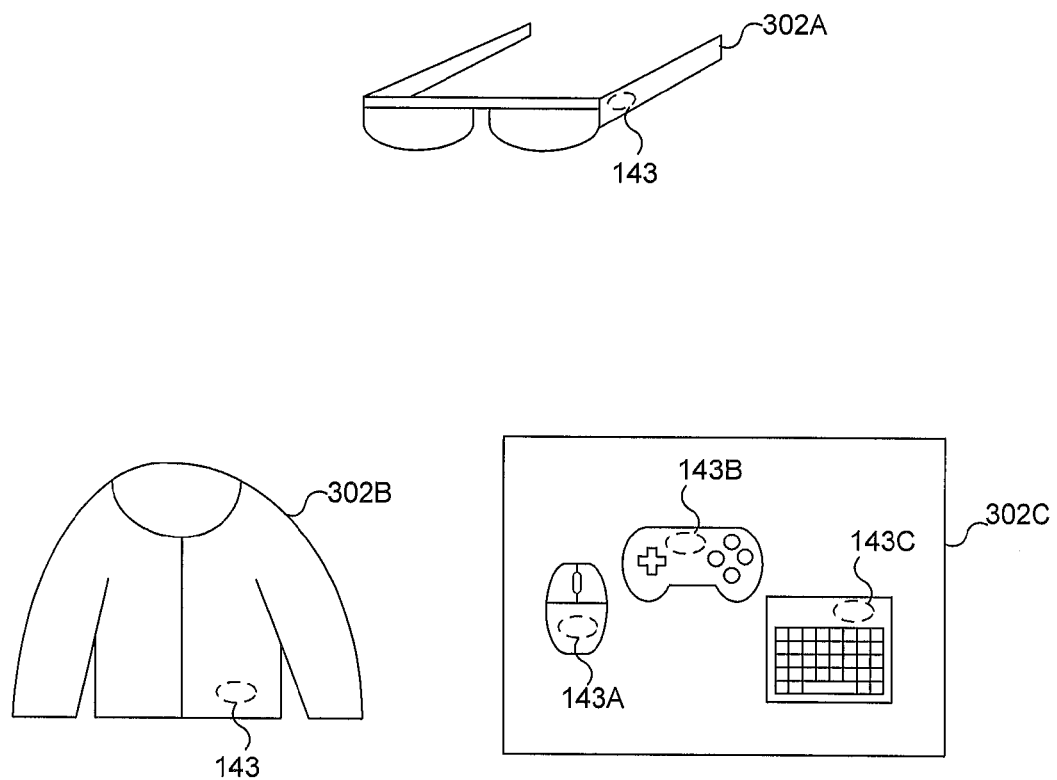
FIG. 4 illustrates examples of implementations of a haptic output device that is incorporated into various user touch points, according to an aspect of the invention.

FIG. 4 illustrates examples of implementations of a haptic output device 143 that is incorporated into various user touch points 302, according to an aspect of the invention. For example, touchpoints 302A and 302B may be configured as wearable devices such as wearable glasses and wearable garments. Other types of wearable devices may be used as well. Touch point 302C may be configured as various user devices that include haptic output devices 143 (illustrated in FIG. 4 as haptic output devices 143A, 143B, . . . 143C), which may include devices such as smartphones, keyboards, mice, game controllers, and/or other user devices.

Figure 5:
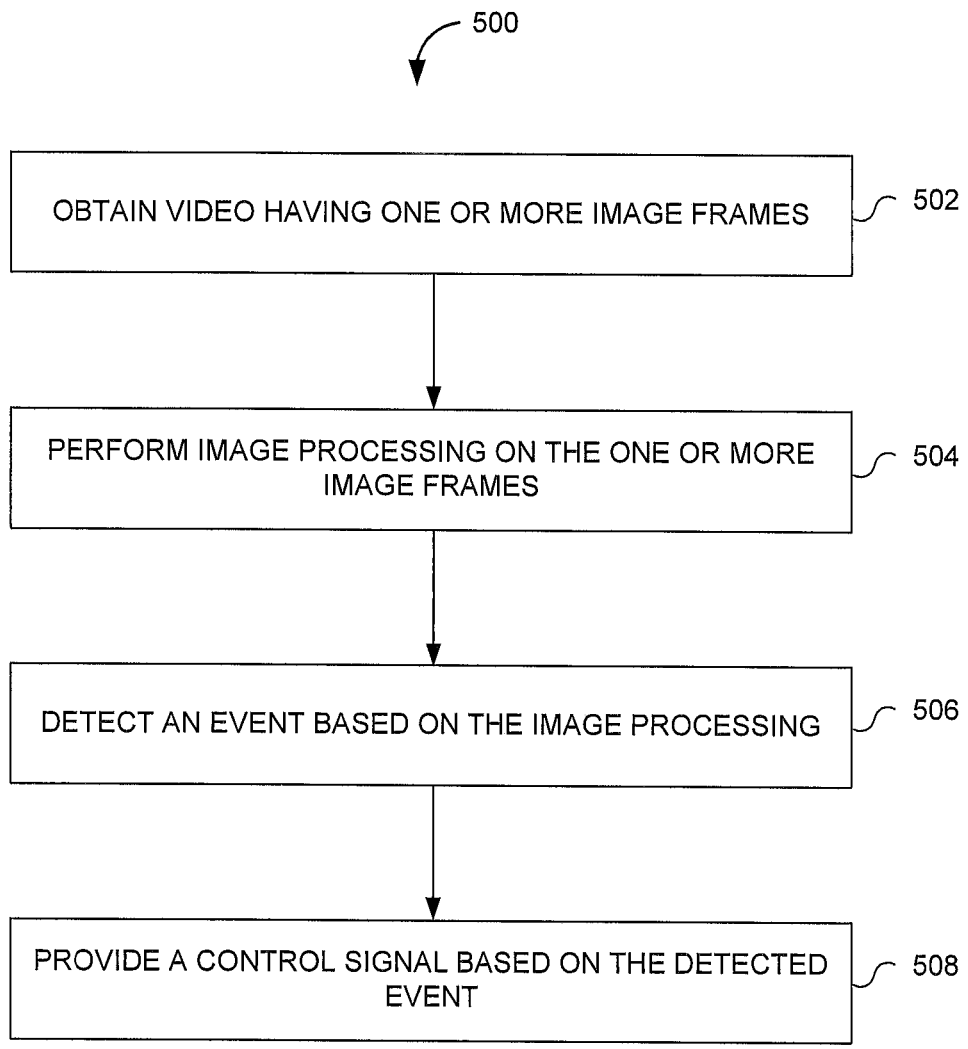
FIG. 5 illustrates an example of a process for generating haptic feedback based on video content analysis, according to an aspect of the invention.

FIG. 5 illustrates an example of a process 500 for generating haptic feedback based on video content analysis, according to an aspect of the invention. The various processing operations depicted in the flowchart of FIG. 5 and other drawing Figures are described in greater detail herein. The described operations may be accomplished using some or all of the system components described in detail above. According to an aspect of the invention, various operations may be performed in different sequences. In other implementations, additional operations may be performed along with some or all of the operations shown in FIG. 5 and other drawing figures, or some operations may be omitted. In yet other implementations, one or more operations may be performed simultaneously. Accordingly, the operations as illustrated (and described in greater detail below) are exemplary in nature and, as such, should not be viewed as limiting.

In an operation 502, a video having one or more image frames may be obtained, which may include captured and/or read. In an operation 504, image processing may be performed on the one or more image frames. In an operation 506, an event based on the image processing may be detected. In an operation 508, a control signal based on the detected event may be provided. The control signal may cause a haptic output device to provide a haptic feedback. Thus, haptic feedback may be generated based on image processing being performed on a video.

Figure 6:
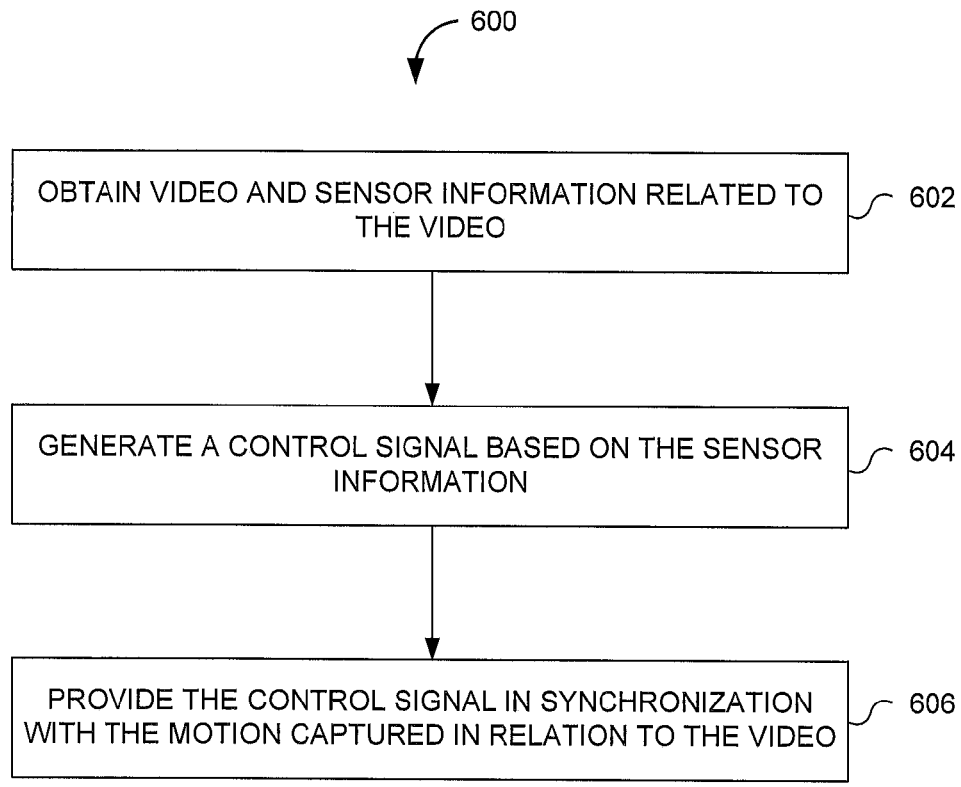
FIG. 6 illustrates an example of a process for generating haptic feedback based on sensor information that includes one or more measurements of a motion of an object appearing on a video, according to an aspect of the invention.

FIG. 6 illustrates an example of a process 600 for generating haptic feedback based on sensor information that includes one or more measurements of a motion of an object appearing on a video, according to an aspect of the invention.

In an operation 602, a video and sensor information associated with the video may be obtained, which may include captured and/or read. The sensor information may include one or more measurements of a motion captured in relation to the video. The motion may include a motion of an object, a motion of an image capture device being moved while capturing the video, and/or other motion that can be measured in relation to the video.

In an operation 604, a control signal based on the sensor information may be generated. The control signal may be configured to cause a haptic feedback. In some implementations, the control signal may be based on the sensor information and output of image processing of the video.

In an operation 606, the control signal may be provided in synchronization with the motion captured in relation to video.

Other aspects, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system, comprising:
    an image capture device configured to capture images; and
    a processor programmed with one or more computer program modules, wherein when executed, the one or more computer program modules are configured to
        receive the images captured by the image capture device;
        perform image processing on the images to generate processed images;
        detect an event in the processed images;
        generate a first control signal for a haptic output device based on the event;
        synchronize the images and the first control signal; and
        output a video with the synchronized images and the first control signal.

2. The system according to claim 1, further comprising:
    a video output device configured to display the video, wherein the haptic output device is configured to generate haptic feedback in synchronization with the video.

3. The system according to claim 2, further comprising:
    a smartphone, wherein the video output device and the haptic output device are part of the smartphone.

4. The system according to claim 3, wherein the processor is part of the smartphone.

5. The system according to claim 1, wherein when executed, the one or more computer program modules are further configured to:
    receive an input from a user of the system identifying or specifying the event.

6. The system according to claim 1, wherein when executed, the one or more computer program modules are further configured to:
    estimate three-dimensional movement of an object captured in the images; and
    generate a second control signal for the haptic output device based on the estimated three-dimensional movement of the object.

7. The system according to claim 1, wherein when executed, the one or more computer program modules are further configured to:
    estimate a three-dimensional image capture device pose from successive frames of the images; and generate a second control signal for the haptic output device based on the estimated three-dimensional image capture device pose.

8. A method, comprising:

receiving a video with a first control signal for a haptic output device, the first control signal being synchronized with the video;

displaying the video with a video output device; and generating haptic feedback based on the first control signal with the haptic output device during said displaying, the haptic feedback being synchronized with images displayed in the video, wherein image processing is performed on the images to generate processed images, and the first control signal is generated based on an event detected in the processed images.

9. A method, comprising:

capturing images with an image capture device;

performing image processing on the images to generate processed images;

detecting an event in the processed images;

generating a first control signal for a haptic output device based on the event during said capturing, the first control signal corresponding to haptic feedback to be generated by the haptic output device; and streaming a video with the images and the first control signal to a user device, the user device including a video output device and the haptic output device.

10. The method of claim 9, wherein said streaming is done in real-time.

11. The method of claim 9, further comprising:

estimating three-dimensional movement of an object captured in the images; and generating a second control signal for the haptic output device based on the estimated three-dimensional movement of the object.

12. The method of claim 9, further comprising:

estimating a three-dimensional image capture device pose from successive frames of the images; and generating a second control signal for the haptic output device based on the estimated three-dimensional image capture device pose.

13. The method of claim 8, further comprising:

receiving an input identifying or specifying the event from a user.

14. The method of claim 8, further comprising:

estimating three-dimensional movement of an object captured in the images; and generating a second control signal for the haptic output device based on the estimated three-dimensional movement of the object.

15. The method of claim 8, further comprising:

estimating a three-dimensional image capture device pose from successive frames of the images; and generating a second control signal for the haptic output device based on the estimated three-dimensional image capture device pose.

* * * * *